United States Patent
Massolini et al.

(10) Patent No.: US 9,570,992 B2
(45) Date of Patent: Feb. 14, 2017

(54) REGULATED MULTIPLE OUTPUT ISOLATED DC TO DC CONVERTER

(71) Applicant: Texas Instruments Incorporated, Dallas, TX (US)

(72) Inventors: Roberto Giampiero Massolini, Pavia (IT); Maurizio Granato, Milan (IT); Giovanni Frattini, Travaco' Siccomario (PV) (IT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/984,076

(22) Filed: Dec. 30, 2015

(65) Prior Publication Data

US 2016/0329815 A1 Nov. 10, 2016

Related U.S. Application Data

(60) Provisional application No. 62/157,155, filed on May 5, 2015.

(51) Int. Cl.
*H02M 3/335* (2006.01)
(52) U.S. Cl.
CPC .............................. *H02M 3/33507* (2013.01)
(58) Field of Classification Search
CPC .................. H02M 3/33507; H02M 3/33561; H02M 2001/007; H02M 2001/009; H02M 2001/342; H02M 3/285; H02M 3/33546; H02M 3/33553; H02M 3/33592
See application file for complete search history.

(56) References Cited

U.S. PATENT DOCUMENTS

| | | | | |
|---|---|---|---|---|
| 5,122,728 A | * | 6/1992 | Ashley | H02M 3/005 323/267 |
| 6,130,828 A | * | 10/2000 | Rozman | H02M 3/33561 363/21.06 |
| 6,728,118 B1 | | 4/2004 | Chen et al. | |
| 8,154,894 B1 | | 4/2012 | Archer | |
| 8,189,355 B2 | | 5/2012 | Kyono | |
| 2004/0190314 A1 | * | 9/2004 | Yoshida | H02M 3/285 363/65 |
| 2006/0028186 A1 | * | 2/2006 | Yan | H02M 3/155 323/225 |
| 2015/0171757 A1 | | 6/2015 | Jin et al. | |
| 2016/0056726 A1 | * | 2/2016 | Sander | H02M 3/33546 363/21.04 |

* cited by examiner

*Primary Examiner* — Adolf Berhane
*Assistant Examiner* — Henry Lee, III
(74) *Attorney, Agent, or Firm* — John R. Pessetto; Charles A. Brill; Frank D. Cimino

(57) ABSTRACT

Disclosed examples include multiple output DC to DC converters with a buck converter including a half bridge switching circuit and transformer primary winding to provide a first output voltage signal, as well as a boost converter to provide an isolated second output voltage signal. The boost converter includes a transformer secondary winding magnetically coupled with the primary winding to provide a boost converter inductor, a switching circuit, an output diode providing the second output voltage signal, and a PWM controller that synchronizes the boost converter switching with the low side switch of the buck converter based on a sensed voltage of the transformer secondary winding.

21 Claims, 8 Drawing Sheets

REGULATED MULTIPLE OUTPUT ISOLATED DC TO DC CONVERTER

REFERENCE TO RELATED APPLICATION

Under 35 U.S.C. §119, this application claims priority to, and the benefit of, U.S. provisional patent application No. 62/157,155, entitled "FLY-BUST MULTIPLE OUTPUT ISOLATED DCDC CONVERTER, filed on May 5, 2015, the entirety of which application is hereby incorporated by reference.

TECHNICAL FIELD

The present disclosure relates to power converters and more particularly to multiple output DC to DC converters.

BACKGROUND

Power conversion circuits or power converters are used to convert input power to deliver output power to drive a load. Multiple output converters deliver two or more outputs, such as output voltage signals to drive separate loads, typically by converting power from a single input source or supply. In many applications, it is desirable to provide two or more isolated output voltages from a single converter. Line regulation is desirable to control the converter output voltages in the presence of potentially wide variation in the input supply voltage received by the converter, and thus it is often desirable to provide some form of regulation for both outputs. When one of the multiple outputs is isolated, namely the second, providing feedback for regulating the second converter output across an isolation barrier is impractical in many applications due to cost and/or size constraints.

SUMMARY

Disclosed examples include multiple output DC to DC converters with a buck converter including a half bridge switching circuit and transformer primary winding to provide a first output voltage signal, as well as a boost converter to provide an isolated second output voltage signal. The boost converter includes a transformer secondary winding magnetically coupled with the primary winding to provide a boost converter inductor, a switching circuit, an output diode providing the second output voltage signal, and a PWM controller that synchronizes the boost converter switching with the low side switch of the buck converter based on a sensed voltage of the transformer secondary winding.

DETAILED DESCRIPTION

Figure 1:
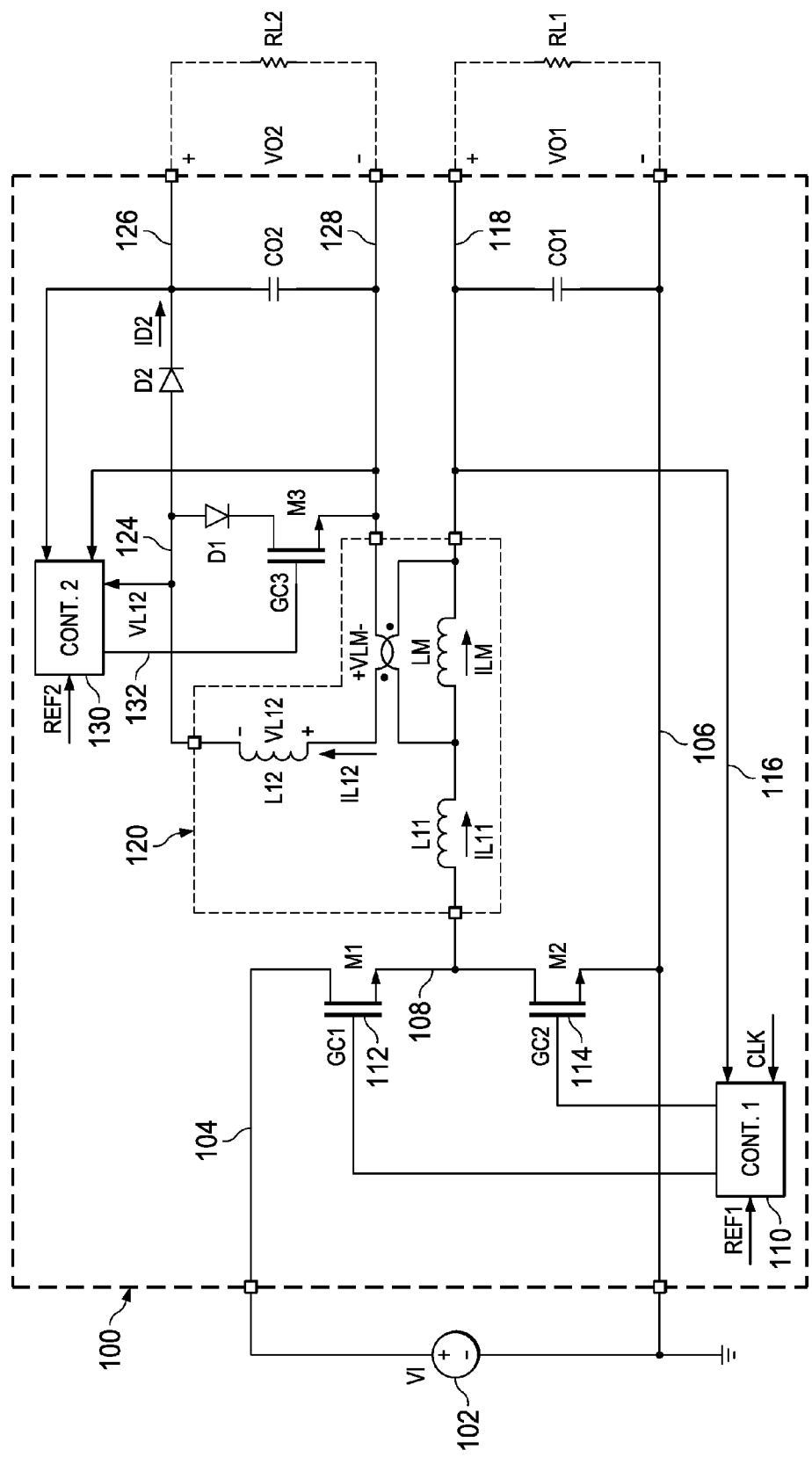
FIG. 1 is a schematic diagram of a multiple output DC to DC converter including a buck converter providing a first output voltage signal and a boost converter providing an isolated second output voltage signal.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . . " Also, the term "couple" or "couples" is intended to include indirect or direct electrical connection or combinations thereof. For example, if a first device couples to or is coupled with a second device, that connection may be through a direct electrical connection, or through an indirect electrical connection via one or more intervening devices and connections.

Figure 10:
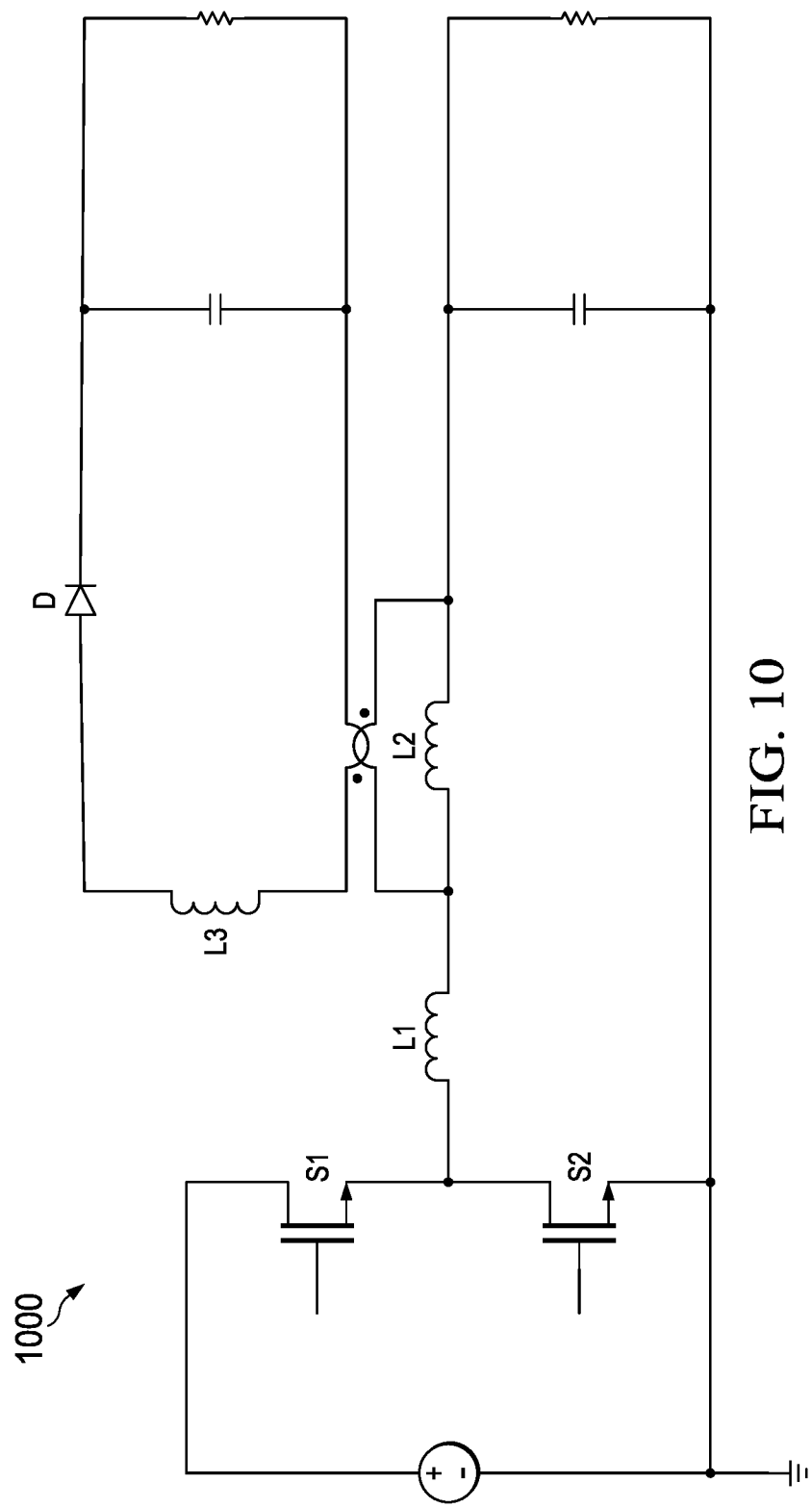
FIG. 10 is a schematic diagram of a multiple output converter.

FIG. 10 shows a dual output converter 1000 including a pair of switches S1 and S2, along with a transformer having a primary winding with inductances L1 and L2 connected between a node joining the switches S1 and S2 and a first output. A secondary winding of the transformer includes an inductance L3 and a rectifier diode D that operates as a second buck converter to provide a second output voltage isolated from the first output. For an ideal transfer function, the output voltage of the lower buck converter in FIG. 10 is generally proportional to the duty cycle employed in operating the switches S1 and S2 multiplied by the input voltage. In this case, the second or upper output voltage signal is also generally proportional to the primary side output voltage, and thus it is proportional to the duty cycle and the input voltage, and the transformer turns ratio can be set in order to provide a nominal second output voltage at a desired level. However, closed loop control of the duty cycle of the primary side buck converter based on feedback of the first output voltage will accommodate changes in the input supply voltage. As a result, when the input supply voltage is high, the lower buck converter operates at a low duty cycle to provide a given output voltage level at the first output. This reduction in the primary side duty cycle affects (i.e., reduces) the second output voltage. Also, absent load variations, changes in the input voltage Vin leads to a duty cycle change to regulate the primary side output voltage. Since the secondary side voltage is proportional to the primary output voltage, the secondary voltage output should not be affected by input voltage fluctuations. However, the secondary side output voltage is not independently regulated, so any change in load at the primary (or secondary) output, or temp, or aging (drift) that affects the closed loop duty cycle control will directly impact the regulation of secondary side output. If the feedback is instead obtained from the upper secondary side buck converter for regulating the primary side switches, the converter 1000 would still suffer from lack of regulation for one of the two output voltages. Moreover, providing feedback from the upper secondary side converter to regulate the control of the switches S1 and S2 requires additional components and cost to cross the isolation barrier between the two voltage domains.

FIG. 1 illustrates a multiple output DC to DC converter circuit 100 that receives an input voltage VI from an external DC source 102 (e.g., a battery), and provides a first output voltage signal VO1 across a first output capacitor CO1 connected to a first (e.g., positive) output node 118. The converter 100 also provides a second output voltage signal VO2 across a second output capacitor CO2 connected to a second output node 126. The input voltage VI is received from the source 102 at a first input node 104 (positive or "+") and a second input node 106 (negative or "−"), where the lower second input node 106 is connected to a constant voltage reference node (e.g., grounded) in the example of FIG. 1. The converter 100 combines a buck converter formed by first and second transistors M1 and M2 and an inductor L11, LM to provide the first output voltage signal VO1, and an isolated boost converter formed by an inductor L12, a switching circuit including a first diode D1 and a third transistor M3, along with a second diode D2 to provide the second output voltage signal VO2. A transformer 120 includes a primary winding forming the buck converter inductor L11, LM, and a secondary winding forming the boost converter inductor L12 to isolate VO2 from VO1. In the drawings, the primary inductance is represented as the series combination of the magnetizing inductance LM and the series inductance L11 of the primary winding of the transformer 120. The secondary leakage inductance is indicated as L12 of the secondary winding of the transformer 120. Any suitable transformer 120 can be used which provides magnetic coupling between the primary and secondary windings or inductors, such as a solid core or air core transformer. The coupling is indicated by the dots shown alongside the primary inductor LM, where a positive primary current ILM, IL11 flowing from left to right in FIG. 1 causes a secondary current IL12 to flow upward in the secondary inductor L12. The associated primary and secondary coil voltages VLM and VL12 are also shown in FIG. 1.

The transistors M1 and M2 form a half bridge switching circuit connected in series between the input nodes 104 and 106. The first transistor M1 provides a high side switch to selectively connect a switching node 108 to the positive DC input node 104. The second transistor M2 provides a low side switch to selectively connect the switching node 108 to the lower DC input node 106. In the illustrated example, M1 and M2 are n-channel field effect transistors (FETs) turned on by active high gate control signals GC1 and GC2. In other examples, p-channel devices can be used or other switching device types can be used, such as bipolar transistors, IGBTs, etc., operated according to corresponding active high or active low signals GC1 and GC2. The primary or first inductor L11, LM is coupled between the switching node 108 and a first output node 118 to provide a first output voltage signal VO1 across the capacitor CO1 to drive a first load, shown as a first load resistor RL1.

Figure 2:
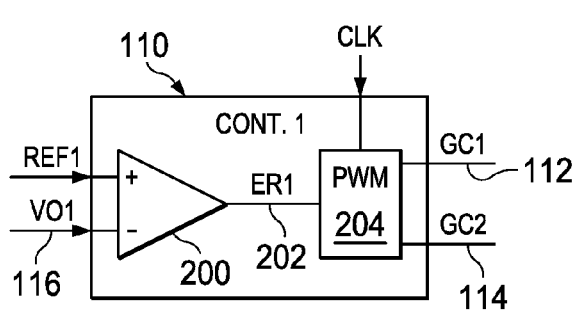
FIG. 2 is a schematic diagram of a first control circuit in the converter of FIG. 1.

Referring now to FIGS. 1 and 2, a first control circuit 110 provides pulse width modulated (PWM) first and second switching control signals GC1 and GC2 on corresponding lines 112 and 114 to control terminals of the first and second transistors M1 and M2. The control circuit 110 includes suitable driver circuits (not shown) to provide control signals GC1, GC2 as alternating PWM signals synchronized to a clock signal CLK to modulate a voltage of the switching node to regulate the first output voltage signal VO1 according to a first voltage reference signal REF1. In addition, the control circuit 110 receives an output voltage feedback signal via line 116 from the first output node 118 representing the first output voltage signal VO1. As shown in FIG. 2, the first control circuit 110 includes a first error amplifier 200 and a first PWM circuit 204. The error amplifier 200 includes inputs receiving the first reference signal REF1 and the output voltage signal VO1 from the first output node 118. An error amplifier output 202 generates a first error signal ER1 according to the difference or error between the input signals REF1 and VO1. The PWM circuit 204 generates complementary pulse width modulated first and second control signals GC1 and GC2 to alternately turn the first and second switches M1 and M2 on and off according to the first error signal ER1. The PWM circuit 204 selectively adjusts a duty cycle of the complementary signals GC1 and GC2 according to the error signal ER1 to regulate the first output voltage signal (VO1) around the REF1 signal value.

Figure 3:
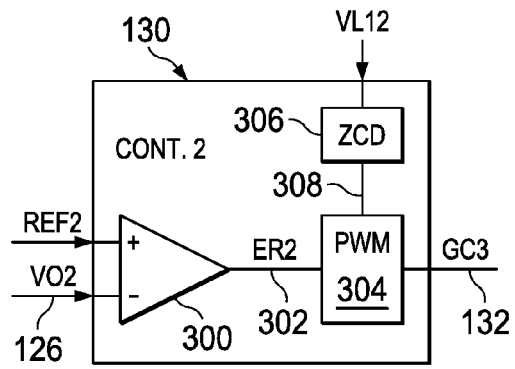
FIG. 3 is a schematic diagram of a second control circuit in the converter of FIG. 1.

Referring now to FIGS. 1 and 3, the transformer secondary winding L12 in FIG. 1 is magnetically coupled with the primary winding L11, LM to provide a boost converter inductor. The second converter is a boost converter formed on the secondary side of the transformer 120 by the inductor L12, and a switching circuit including a first diode D1 and a third transistor switching device M3. An output diode D2 provides the second output voltage signal VO2 at the node 126. The switching circuit including the first diode D1 and the switch M3 are coupled in series across the second inductor L12 between a first internal node 124 in the example of FIG. 1. In this example, an upper or first end of the secondary winding L12 is connected to the first internal node 124, and the anode of D1 is connected to the first internal node 124. The cathode of D1 is connected to the drain of M3, and the anode of D2 is connected to the first internal node 124. The cathode of D2 is connected to a second internal node 128 to provide the second output voltage signal VO2 between the second output node 126 and the node 128.

The third switch M3 can be an n-channel FET in the example of FIG. 1. In other examples, a p-channel FET can be used, or a bipolar transistor can be used (n or p type) or another suitable switching device can be used (e.g., IGBT, etc.) which operates according to corresponding active high or active low signal GC3. M3 operates as a low side boost converter switch according to selectively couple the upper end of the inductor L12 to the node 128 through the diode D1 according to a third PWM switching control signal GC3 from a second control circuit 130. The magnetic coupling of the inductor L12 with the first inductor L11, LM transfers energy to the boost converter to provide the second output voltage signal VO2 isolated from the first output signal VO1. The secondary switching operation of M3 and the control circuit 130 provides separate regulation of the output voltage VO2 to accommodate variation in the input voltage VI and load changes seen by the second converter stage. In FIG. 1, the second output voltage signal VO2 drives a second load, represented as a second load resistor RL2, and the output voltage VO2 is stabilized by the output capacitor CO2.

FIG. 3 shows an example of the second control circuit 130 in the converter of FIG. 1. In operation, the control circuit 130 provides the switching control signal GC3 to M3 as a PWM signal with a controlled duty cycle to control the signal VO2. The second control circuit 130 includes a second error amplifier 300 with an output 302 that generates a second error signal ER2 according to a second reference signal REF2 and the second output voltage signal VO2 from the output node 126. A second PWM circuit 304 receives the second error signal ER2 and includes driver circuitry (not shown) to provide a pulse width modulated control signal GC3 on line 132 of FIG. 1 to alternately turn M3 on and off according to the error signal ER2 to regulate the output voltage signal VO2. In addition, the control circuit 130 is synchronized with the switching of the primary side buck converter. In one example, the second control circuit 130 includes a zero crossing detector circuit 306 which senses a zero crossing in a voltage VL12 at the upper end of the second transformer winding or inductor L12, and provides a signal on line 308 to the PWM circuit 304.

The PWM circuit 304 provides the control signal GC3 to the third switch M3 in response to detection of the zero crossing in the voltage VL12 to synchronize switching of the third switch M3 to the switching of the second switch M2. In this manner, the lower buck converter and the upper boost converter in FIG. 1 operate at the same PWM frequency set by the CLK signal. The buck and boost converters separately control their individual PWM duty cycles based on individual closed loop feedback to regulate the respective first and second output voltage signals VO1 and VO2 according to the first and second reference signals REF1 and REF2. Unlike the control approach in FIG. 10, the multiple output converter 100 of FIG. 1 provides load and line regulation to accommodate wide variations in the input voltage VI, and no additional circuitry is needed to deliver feedback signaling across the isolation barrier provided by the transformer 120. Instead, the second PWM controller or control circuit 130 synchronizes the boost converter switching with the low side buck converter switching of M2 based on a sensed voltage of the transformer secondary winding L12. In addition, the dual regulation of the output voltages VO1 and VO2 is independent of the transformer coupling factor.

Figure 8:
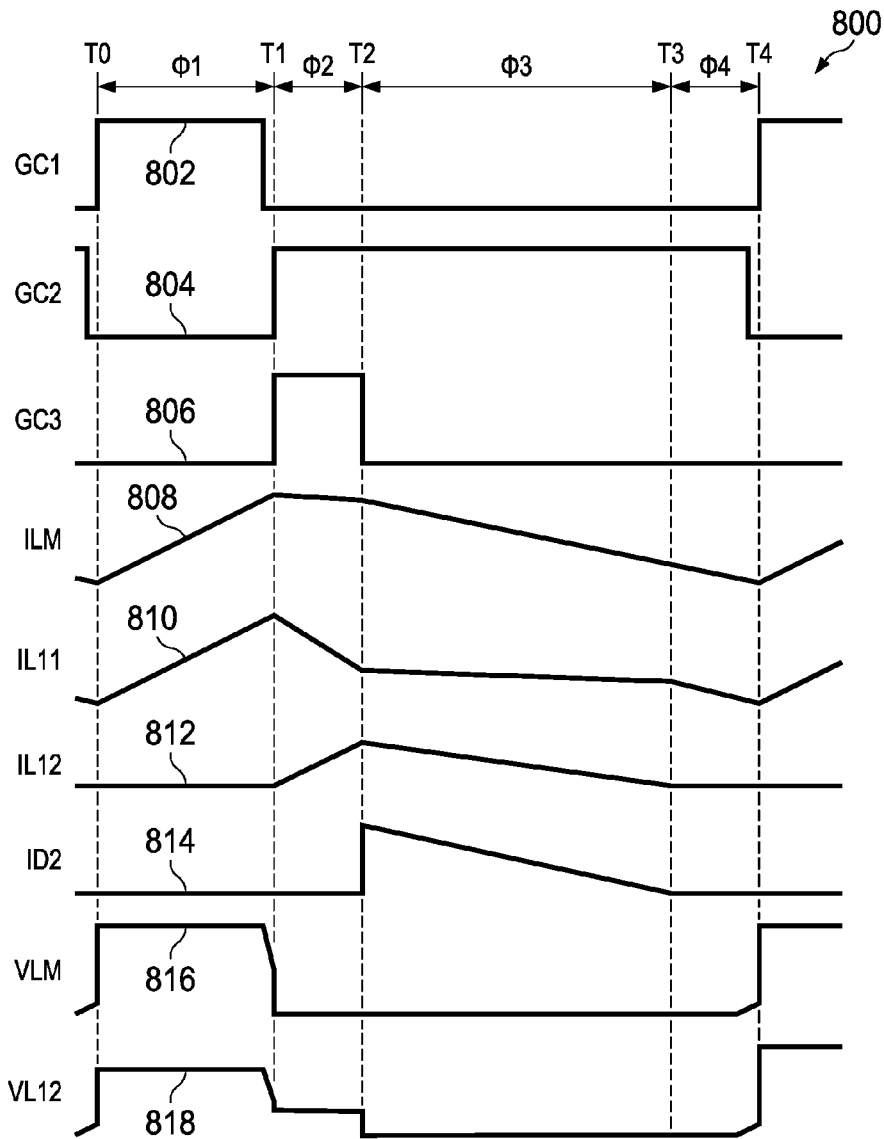
FIG. 8 is a waveform diagram of various signals in the converter of FIG. 1.

Referring also to FIGS. 4-8, the converter 100 operates in a series of states or phases φ in each PWM cycle or period of the clock signal CLK. FIGS. 4-7 illustrate different switching conditions or states φ1-φ4 and FIG. 8 provides a waveform diagram 800 showing various signals in the converter 100 of FIG. 1 during the different phases φ1-φ4.

Figure 4:
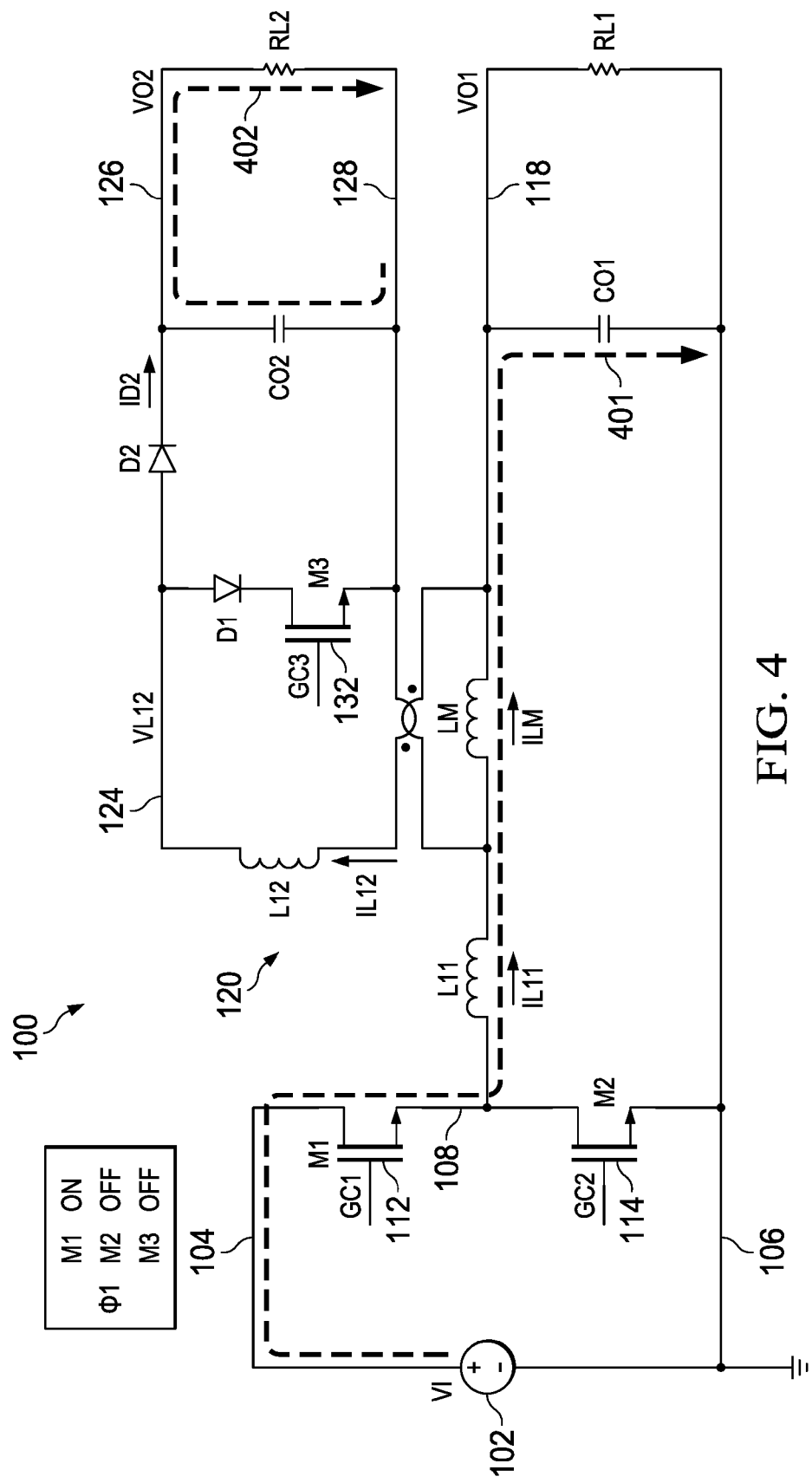
FIGS. 4-7 are schematic diagrams of different switching conditions in the converter of FIG. 1.

FIG. 4 shows a first phase (φ1) in which M1 is turned on (GC1 active high), while M2 and M3 are off (GC2 and GC3 low). In phase φ1, the primary side current IL11 and ILM flows along a first path 401 from the source 102 through the positive input node 104, first switch M1, and the inductor L11, LM to the first output node 118 to charge the capacitor CO1 and/or to drive the first load RL1. In the first phase φ1, the high side switch M1 is turned on, and the primary side inductor is charged. The inductor current provides zero voltage switching for the low side device M2, and the secondary side output diode D2 is turned off and no current ID2 flows. At T0 in FIG. 8, the first control circuit 110 (FIG. 1) provides an active high signal GC1 (curve 802) while GC2 (curve 804) and GC3 (curve 806) are held low. With M1 turned on in phase φ1, the currents ILM (curve 808) and IL11 (curve 810) rise from T0 through T1. Because the secondary switch M3 is off (GC3 is low), the secondary current IL12 (curve 812) and the current ID2 through the second diode D2 (curve 814) remain at zero from T0 through T1. In this state, output current flows along a path 402 from the second output capacitor CO2 to the load RL2 as shown in FIG. 4. The voltage VLM across the magnetizing coil inductor LM (curve 816) and the voltage VL12 (curve 818) rise at T0 and remain at nonzero levels while GC1 is high (switch M1 turned on) during φ1. The first control circuit 110 provides a non-zero dead time by turning off M1 (GC1 curve 802 goes low) prior to turning on M2 (GC2 going high in curve 804). During this interval, the inductor voltages shown in curves 816 and 818 begin to decrease, and drop quickly when M2 and M3 are turned on at T1 in FIG. 8.

Figure 5:
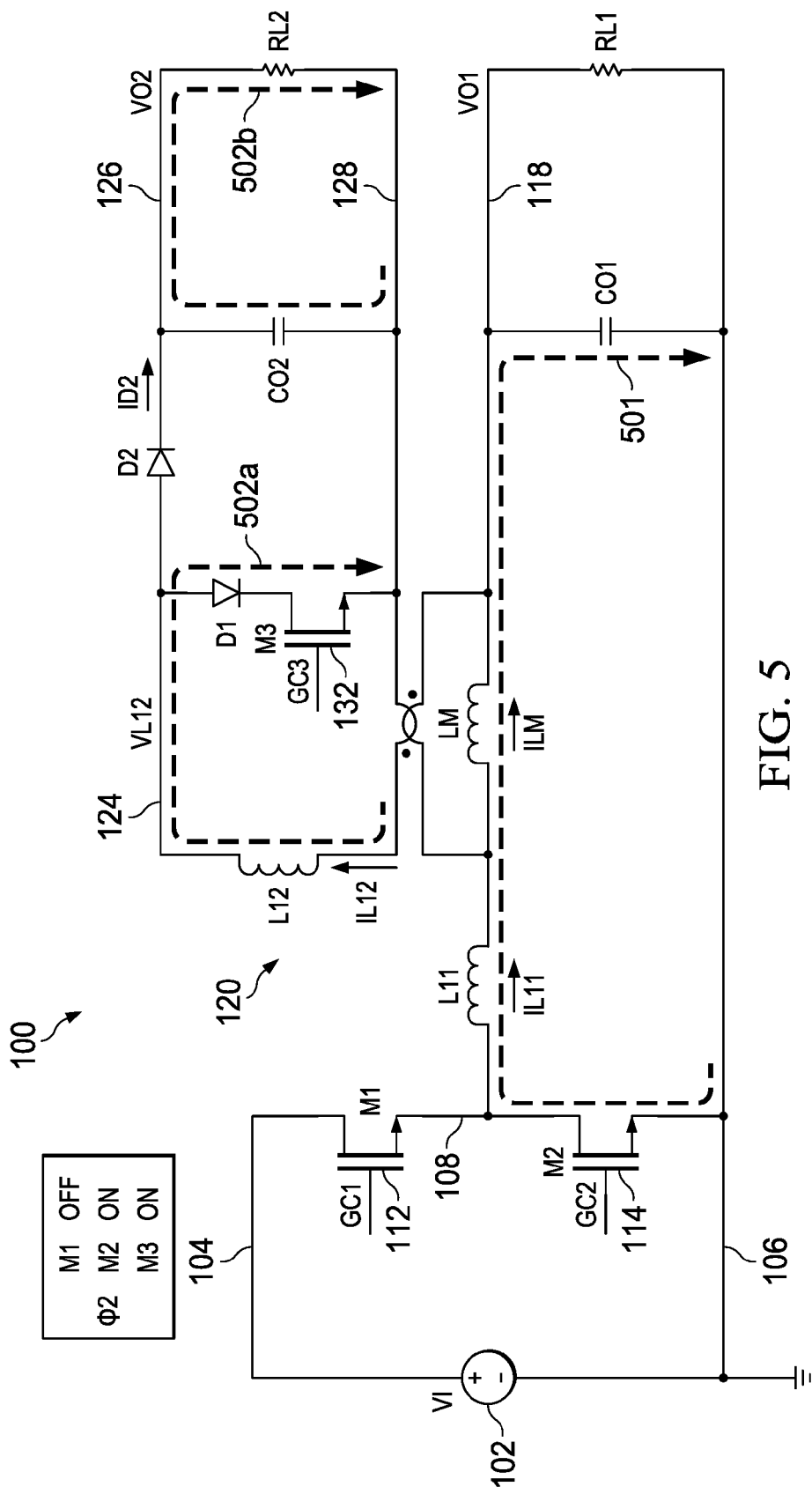

FIG. 5 shows the second phase φ2, during which the high side switch M1 is turned off and the low side switch M2 is turned on to discharge the primary side inductor L11, LM. The second control circuit 130 (FIG. 1) detects a zero crossing in the voltage VL12 of the secondary inductor L12 (curve 818 in FIG. 8), and in response, turns on M3 by providing an active high signal GC3 (curve 806) The positive inductor current pulls down the voltage of the switching node 108, and the secondary side switch M3 is turned on to load current in the leakage inductance L12. There may be some delay between the turn on times of M2 and M3, but the buck converter and the secondary side boost converter are synchronized by the start of the on-time of M3 in response to the switching of M2 so that both converters operate at the same overall PWM switching frequency. The second phase φ2 begins at T1 in FIG. 8 with M1 off, and M2 and M3 turned on. Turning on the low side buck converter switch M2 leads to the primary side current IL11 and ILM flowing along a path 501 through M2, L11 and LM to the first output capacitor CO1 and/or the load RL1 in FIG. 5. Because the secondary side switch M3 is turned on in φ2, the current IL12 through the inductor L12 (curve 812 in FIG. 8) begins to rise from T1 to T2, while this current flows along a path 502a in FIG. 5. In addition, the output current of the secondary side boost converter continues to flow along the path 502b in FIG. 5 during φ2.

Figure 6:
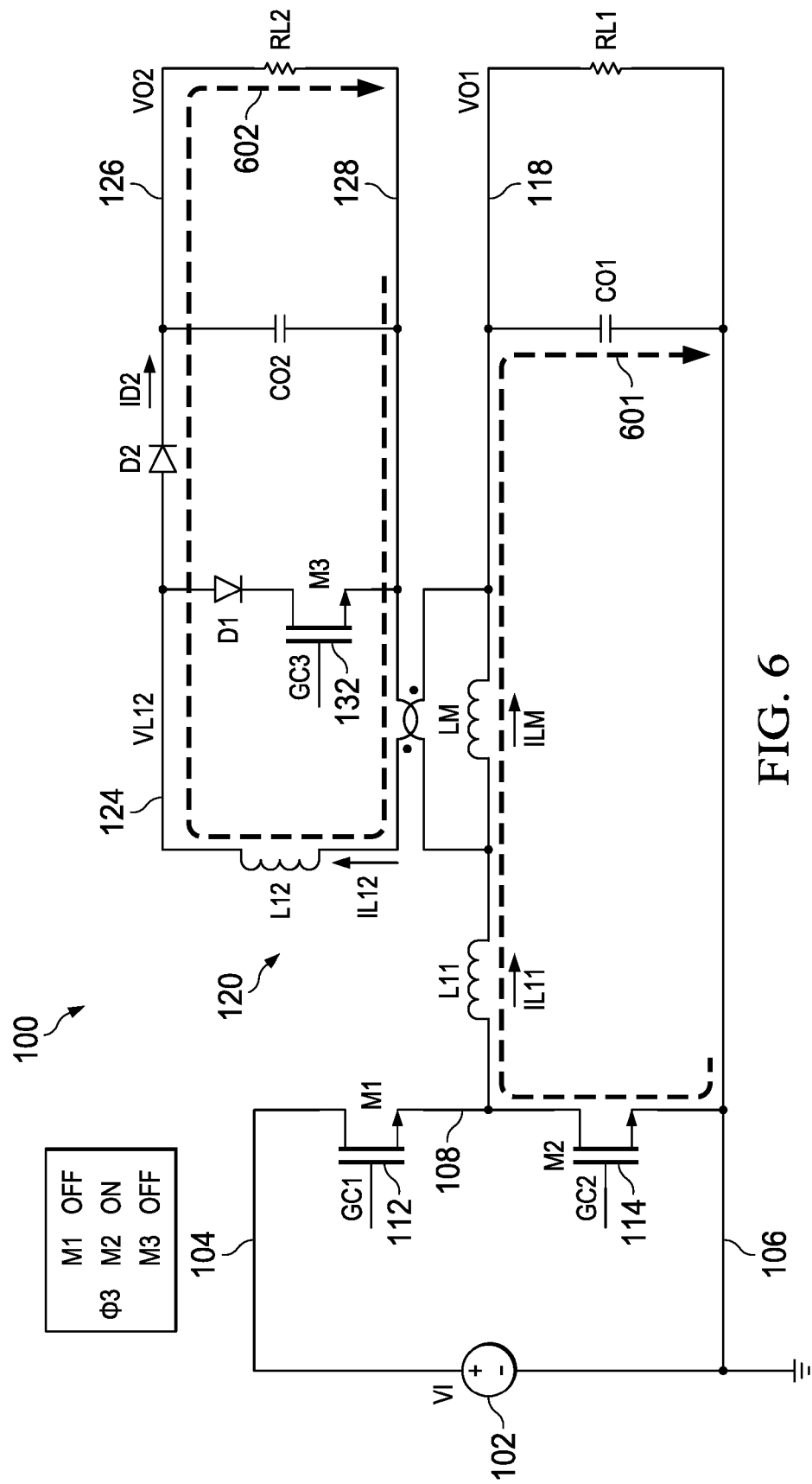

FIG. 6 shows operation in a third phase φ3 from T2 to T3 in FIG. 8. The second control circuit 130 implements closed loop feedback pulse width modulated duty cycle control of the second output voltage VO2 according to the second error signal ER2 (FIG. 3). The time difference T2–T1 is the on-time or duty cycle of the secondary control loop determined by comparison of the second reference signal REF2 with the second output voltage feedback signal VO2 by the error amplifier 300 in FIG. 3. In this regard, the PWM circuit 304 (and the primary side PWM circuit 204 in FIG. 2) includes suitable circuitry for comparing a periodic ramp signal to the corresponding error signal in order to control the PWM duty cycle or on-time, where the first PWM circuit 204 also includes circuitry to implement complementary signals GC1 and GC2 for the high and low side switch is M1 and M2. Moreover, the PWM circuitry 204 in certain examples includes dead time compensation circuits to ensure that M1 and M2 are not both turned on at the same time (e.g., as shown in the curves 802 and 804 in FIG. 8).

During the third phase φ3 from T2 through T3 in FIG. 8, the second control circuit 130 turns off the secondary side switch M3 (GC3 goes low in curve 806 of FIG. 8). The primary side current through the inductors L11 and LM flows along the path 601, and the transformer magnetizing inductance (represented as LM in FIGS. 1 and 4-7) sees the magnetic loading effect of the secondary current flow along a path 602 in FIG. 6. From T2 through T3, the primary side inductor currents ILM and IL11 decrease (curves 808 and 810), with ILM decreasing faster than IL11. As seen in curve 814, the current ID2 through the second diode D2 increases quickly in response to M3 being turned off at T2, and then ramps down to zero from T2 through T3.

Figure 7:
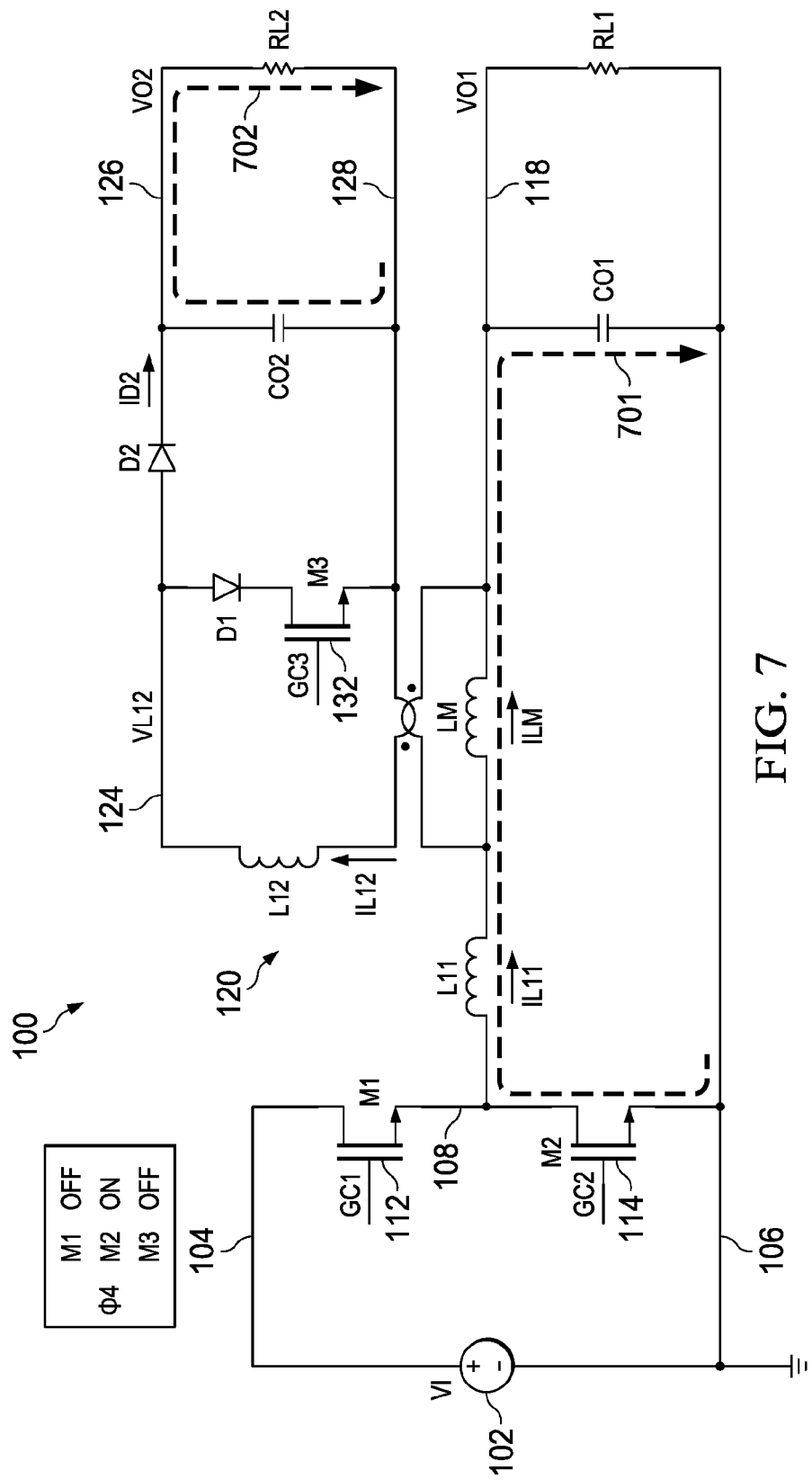

FIG. 7 shows the fourth phase φ4, beginning at T3 when the secondary inductor current IL12 reaches zero and the output diode D2 turns off (ID2 curve 814 goes to zero at T3 in FIG. 8). The primary side switch M2 remains on to continue discharging the primary side inductance, and the leakage inductance L12 on the secondary side is discharged. The secondary side output current flows through the load RL2 along a path 702 during φ2, and the primary side current continues to flow along a path 701 as seen in FIG. 7. As shown in FIG. 8, the inductor currents ILM and IL11 (curves 808 and 810) continue to decrease from T3 to T4 during φ4. Eventually, the closed loop control of the primary side buck converter (control circuit 110 in FIGS. 1 and 2) ends the illustrated PWM cycle and begins the next PWM cycle by turning off M2 (GC2, curve 804 goes low in FIG.

8), and then the first control circuit 110 again turns on M1 at T4 (GC1 goes high as shown in FIG. 802).

Figure 9:
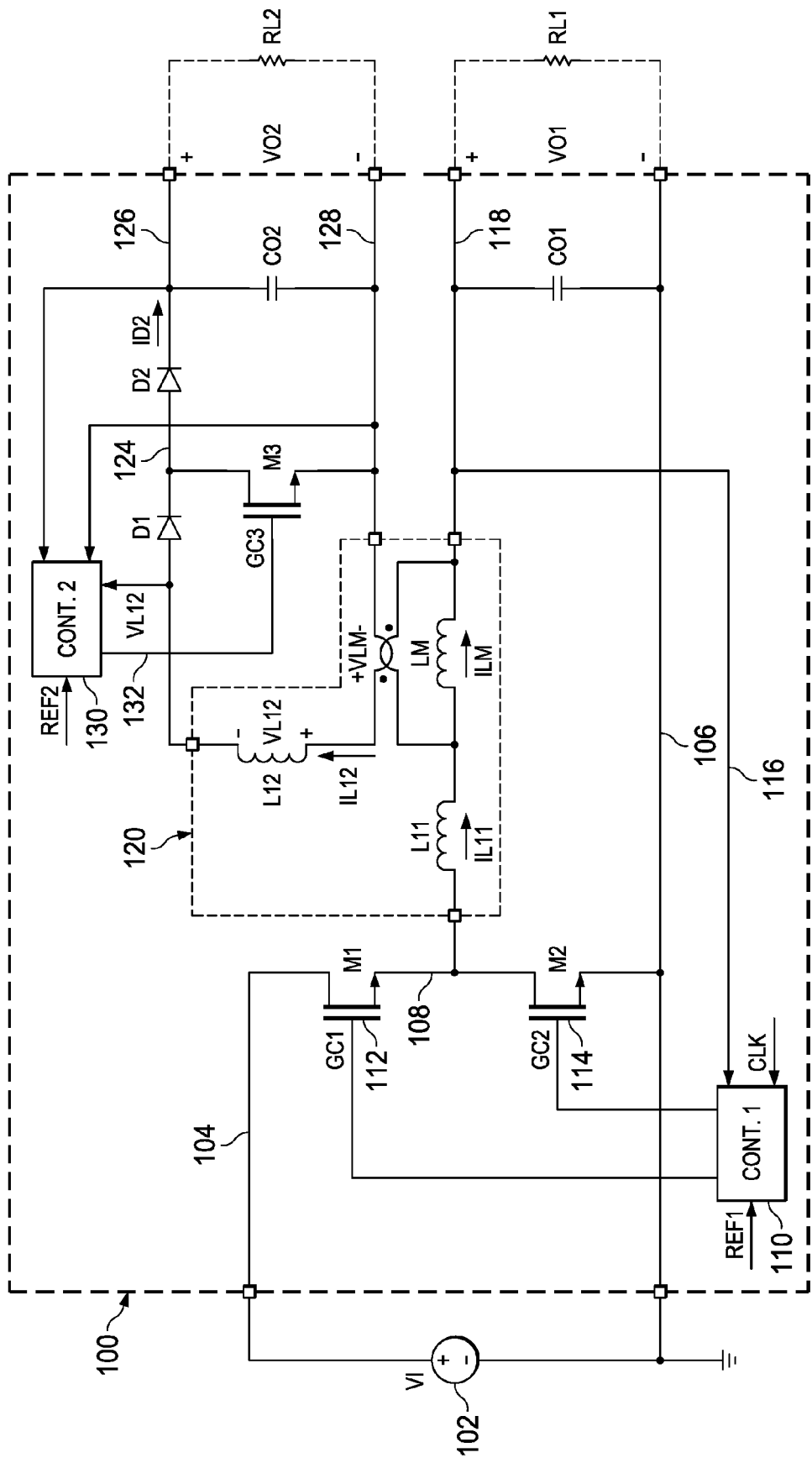
FIG. 9 is a schematic diagram of another DC to DC converter example.

FIG. 9 shows another example of a converter 100, in which the diode D1 is moved to the upper branch between the first end of the inductor L12 and the first internal node 124. In this example, the first end of the secondary winding L12 is connected to the anode of the diode D1 and the cathode of D1 is connected to the first internal node 124. The anode of the second diode D2 and the drain of M3 are connected to the first internal node 124. In this example, the switch M3 and the diode D2 form the half-bridge of a boost converter on the secondary side. Like the example of FIGS. 1 and 4-7, the converter 100 in FIG. 9 provides separately regulated first and second outputs VO1 and VO2, which are isolated from one another via the transformer 120. In addition, the first and second control circuits 110 and 130 are synchronized to operate at the same PWM switching frequency without conveying feedback or control signaling across the isolation barrier. The example of FIGS. 1 and 4-7 advantageously has only one diode (D2) in the output path between the first (upper) and of L12 and the second output node 126, whereas the upper circuit branch in the example converter 100 of FIG. 9 has two diode drops due to the series configuration of D1 and D2. Otherwise, the converter circuits 100 of the examples in FIGS. 1 and 9 both operate generally as described above.

In other examples, a fourth switch is substituted for the secondary side output diode D2. The fourth switch is operated according to a corresponding control signal from the second control circuit 130. For example, the second control circuit 130 can generate a signal to operate the secondary side output switch as an emulated diode. The control circuit 130 may include a zero crossing detection circuit to operate the additional secondary output switch for zero current switching to turn the switch off similar to the natural switching operation of the substituted output diode D2, while improving efficiency in high current or low output voltage applications. In operation, the secondary side output switch (substituted for D2) and the third switch M3 provide high side and low side switches for operating a boost converter on the secondary side of the converter.

The disclosed examples advantageously facilitate operation using a single, potentially wide dynamic range, input source 102, and separately provide both load and line regulation for the respective first and second output voltage signals VO1 and VO2 by operation of the close loop first and second control circuits 110 and 130. Moreover, the disclosed examples do not suffer from the low coupling factor operational shortcomings of the configuration 1000 in FIG. 10, particularly for low duty cycles. In this regard, the separate regulation of the primary side buck converter and the secondary side boost converter in FIGS. 1 and 9 operates independent of the coupling factor of a given transformer 120. This is unlike the circuit 1000 of FIG. 10, in which coupling factor limitations, particularly at low duty cycle values for high input voltages, could lead to insufficient output voltage at the isolated secondary side load. Also, the circuit 1000 of FIG. 10 suffers from poor control when high load is drawn from the secondary side output. If the power drawn is very high the voltage drops and there is no way to recover with duty cycle control in the circuit 1000. Moreover, the disclosed examples use a single transformer 120 in order to deliver power to both sides of a galvanic isolated module, where the primary side circuitry (buck converter) provides a step-down conversion and the secondary side circuitry (boost converter) provides a step-up conversion of the primary side regulated voltage. Moreover, the second output voltage VO2 is regulated without using a feedback channel across the isolation barrier. In addition, the twitching operation of the second control circuit 130 is synchronized with the low side switching by the first control circuit 110, and thus the secondary side converter does not need a separate clock circuit, and the buck and boost converters each operate at the same PWM frequency.

The secondary side voltage control circuit 130 operates independently of the first control circuit 110, and secondary side load fluctuations do not adversely impact the provision of the primary side buck converter output voltage VO1. These examples, moreover, take advantage of the leakage inductance L12 on the secondary side in order to implement a boost converter, and therefore transformer topologies such as air core designs having relatively high leakage inductance can be used. This is in contrast to flyback or flybuck converter configurations (e.g., FIG. 10) in which low transformer coupling factors and high transformer leakage inductances are seen as disadvantages. In this regard, the disclosed examples advantageously mitigate control difficulties previously associated with low transformer coupling factors. In disclosed examples, the secondary side boost converter topology acts as a secondary side boost, allowing a relatively high primary side inductance to limit RMS current and improved efficiency of the primary side buck converter, while the transformer turns ratio can be adjusted to provide sufficient boost for use with a relatively low secondary side inductance (e.g., leakage inductance) to facilitate discontinuous mode (DCM) operation and linear steady state transfer function.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The invention claimed is:
1. A converter circuit, comprising:
first and second input nodes to receive an input voltage signal,
a transformer;
a first converter circuit, including:
a first switching device coupled between the first input node and a switching node,
a second switching device coupled between the switching node and the second input node,
a primary winding of the transformer, the primary winding including a first end coupled with the switching node, and a second end coupled with a first output node to provide a first output voltage signal, and
a first control circuit to provide a first switching control signal to the first switching device, and to provide a second switching control signal to the second switching device to modulate a voltage at the switching node to control the first output voltage signal; and
a second converter circuit, including:
a secondary winding of the transformer, the secondary winding including a first end coupled with a first internal node, and a second end coupled with a second internal node,
a first diode connected to the first internal node,
a third switching device connected between a cathode of the first diode and the second internal node, a second diode, including an anode connected to the first diode, and a cathode coupled with a second output node to provide a second output voltage signal, and a second control circuit to provide a third switching control signal to the third switching device to control the second output voltage signal.

2. The converter circuit of claim 1, wherein the second control circuit synchronizes switching of the third switching device to switching of the second switching device.

3. The converter of claim 2, wherein the second control circuit includes a zero crossing detector circuit to sense a zero crossing in a voltage at the first end of the secondary winding to detect the second switching device turning on; and wherein the second control circuit provides the third switching control signal to the third switching device in response to detection of the second switching device turning on to synchronize the switching of the third switching device to the switching of the second switching device.

4. The converter of claim 2,
wherein the first control circuit provides the first and second switching control signals as alternating pulse width modulated signals to regulate the first output voltage signal according to a first voltage reference signal; and
wherein the second control circuit provides the third switching control signal as a pulse width modulated signal to regulate the second output voltage signal according to a second voltage reference signal.

5. The converter of claim 4, wherein the first end of the secondary winding is connected to the first internal node; wherein an anode of the first diode is connected to the first internal node; wherein the cathode of the first diode is connected to the third switching device; and wherein the anode of the second diode is connected to the first internal node.

6. The converter of claim 4, wherein the first end of the secondary winding is connected to an anode of the first diode; wherein the cathode of the first diode is connected to the first internal node; and wherein the anode of the second diode is connected to the first internal node.

7. The converter of claim 1,
wherein the first control circuit provides the first and second switching control signals as alternating pulse width modulated signals to regulate the first output voltage signal according to a first voltage reference signal; and
wherein the second control circuit provides the third switching control signal as a pulse width modulated signal to regulate the second output voltage signal according to a second voltage reference signal.

8. The converter of claim 7, wherein the first end of the secondary winding is connected to the first internal node; wherein an anode of the first diode is connected to the first internal node; wherein the cathode of the first diode is connected to the third switching device; and wherein the anode of the second diode is connected to the first internal node.

9. The converter of claim 7, wherein the first end of the secondary winding is connected to an anode of the first diode; wherein the cathode of the first diode is connected to the first internal node; and wherein the anode of the second diode is connected to the first internal node.

10. The converter of claim 1, wherein the first end of the secondary winding is connected to the first internal node; wherein an anode of the first diode is connected to the first internal node; wherein the cathode of the first diode is connected to the third switching device; and wherein the anode of the second diode is connected to the first internal node.

11. The converter of claim 1, wherein the first end of the secondary winding is connected to an anode of the first diode; wherein the cathode of the first diode is connected to the first internal node; and wherein the anode of the second diode is connected to the first internal node.

12. A multiple output isolated DC to DC converter, comprising:
first and second switches connected to one another at a switching node and connected in series with one another between a first input node and a second input node;
a first transformer winding connected between the switching node and a first output node;
a first error amplifier to generate a first error signal according to a first reference signal and a first output voltage signal at the first output node;
a first PWM circuit to provide complementary pulse width modulated first and second control signals to alternately turn the first and second switches on and off according to the first error signal to regulate the first output voltage signal;
a second transformer winding magnetically coupled with the first transformer winding, the second transformer winding coupled between a first internal node and a second internal node;
a first diode connected to the first internal node;
a third switch connected between a cathode of the first diode and the second internal node;
a second diode, including an anode connected to the first diode, and a cathode coupled with a second output node;
a second error amplifier to generate a second error signal according to a second reference signal and a second output voltage signal at the second output node; and
a second PWM circuit to provide a third pulse width modulated control signal to alternately turn the third switch on and off according to the second error signal to regulate the second output voltage signal, the third control signal being synchronized with the second control signal.

13. The converter of claim 12, further comprising a zero crossing detector circuit to sense a zero crossing in a voltage at the first end of the second transformer winding; wherein the second PWM circuit provides the third pulse width modulated control signal to the third switch in response to detection of the zero crossing in a voltage at a first end of the second transformer winding to synchronize the switching of the third switch to the switching of the second switch.

14. The converter of claim 13, wherein the first end of the second transformer winding is connected to the first internal node; wherein an anode of the first diode is connected to the first internal node; wherein the cathode of the first diode is connected to the third switch; and wherein the anode of the second diode is connected to the first internal node.

15. The converter of claim 13, wherein the first end of the second transformer winding is connected to an anode of the first diode; wherein the cathode of the first diode is connected to the first internal node; and wherein the anode of the second diode is connected to the first internal node.

16. The converter of claim 12, wherein a first end of the second transformer winding is connected to the first internal node; wherein an anode of the first diode is connected to the first internal node; wherein the cathode of the first diode is connected to the third switch; and wherein the anode of the second diode is connected to the first internal node.

17. The converter of claim 12, wherein a first end of the second transformer winding is connected to an anode of the first diode; wherein the cathode of the first diode is connected to the first internal node; and wherein the anode of the second diode is connected to the first internal node.

18. A DC to DC converter, comprising:
   a buck converter, including a half bridge switching circuit to modulate a voltage of a switching node, and a first inductor coupled between the switching node and a first output node to provide a first output voltage signal; and
   a boost converter, including;
      a second inductor magnetically coupled with the first inductor,
      a switching circuit with a first diode and a switch coupled with the second inductor,
      a second diode connected between the switching circuit and a second output node to provide a second output voltage signal, and
      a control circuit synchronized with a voltage signal of the second inductor to operate the switch to regulate the second output voltage signal.

19. The DC to DC converter of claim 18, wherein an anode of the first diode is connected to an anode of the second diode; and wherein a cathode of the first diode is connected to the switch.

20. The DC to DC converter of claim 18, wherein an anode of the first diode is connected to the second inductor; and wherein a cathode of the first diode is connected to an anode of the second diode.

21. A DC to DC converter, comprising:
   a buck converter, including a half bridge switching circuit to modulate a voltage of a switching node, and a first inductor coupled between the switching node and a first output node to provide a first output voltage signal; and
   a boost converter, including;
      a second inductor magnetically coupled with the first inductor,
      a switching circuit with a first diode and a first secondary side switch coupled with the second inductor,
      a second secondary side switch connected between the switching circuit and a second output node to provide a second output voltage signal, and
      a control circuit synchronized with a voltage signal of the second inductor to operate the first and second secondary side switches to regulate the second output voltage signal.

* * * * *